Feb. 14, 1950 L. E. GROSBOLL 2,497,448
VALVE
Filed Jan. 22, 1946 2 Sheets-Sheet 1

INVENTOR
LORIN E. GROSBOLL
BY *Cushman Darby Cushman*
ATTORNEYS

Feb. 14, 1950     L. E. GROSBOLL     2,497,448
VALVE

Filed Jan. 22, 1946     2 Sheets-Sheet 2

INVENTOR.
LORIN E. GROSBOLL
BY
ATTORNEYS

Patented Feb. 14, 1950

2,497,448

UNITED STATES PATENT OFFICE 2,497,448

VALVE

Lorin E. Grosboll, Decatur, Ill., assignor to Mueller Co., Decatur, Ill., a corporation of Illinois Application January 22, 1946, Serial No. 642,607

6 Claims. (Cl. 251—163)

In the usual rotary plug valve employing O-rings on the plug, the difficulty exists that as the ported plug is turned from on to off position, the leading side of the O-ring passing the housing outlet port tends to be forced out of its groove so as to be pinched and mutilated as it passes the far edge of the outlet port. This is caused by pressure passing around the plug in a path which includes the plug passage and jetting past the leading side of the O-ring as it approaches the far edge of the outlet port and being trapped under the said leading side as it makes contact with the said edge. If the sealing means are applied to the valve seat instead of to the plug the same difficulty exists as regards the portion of the sealing means at the far side of the housing inlet port. The object of the present invention is to eliminate this difficulty by so relating the O-rings, or equivalent continuous sealing elements, and ports, that when the plug is turned from on to off position the housing port remote from the port at which the pinching would ordinarily occur is first sealed off so as to cut off the flow through the plug passage so that the disturbing action, which would be caused or permitted by such flow, is eliminated.

Figure 1:
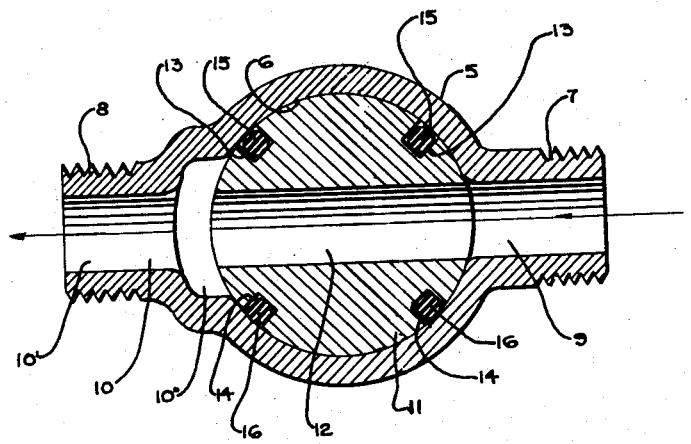
Figure 2:
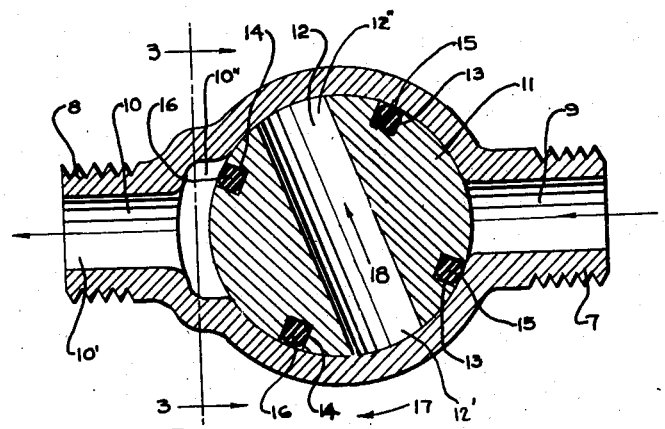
Figure 3:
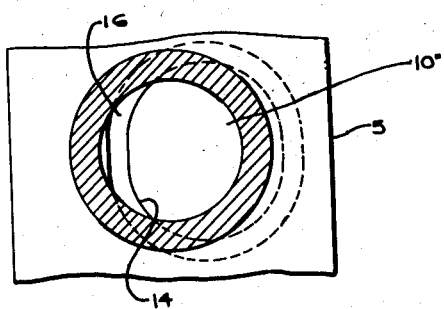
Figure 4:
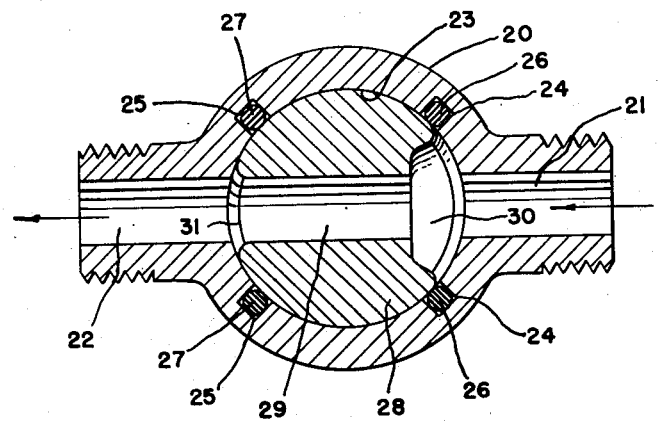
Figure 5:
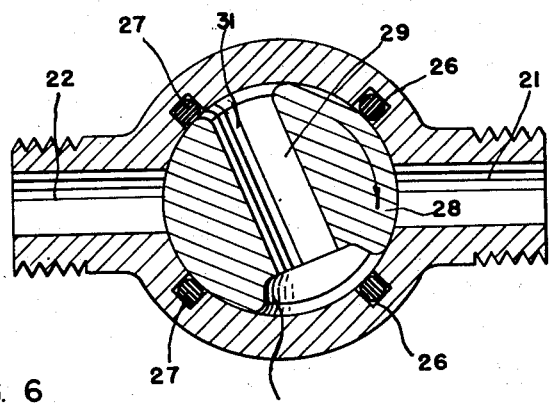
Figure 6:
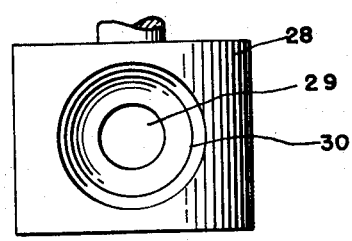

I have shown illustrative embodiments of the invention in the accompanying drawings in which Figure 1 is a section of a rotary plug valve taken in a plane which includes the common axis of opposed housing inlet and outlet ports and is perpendicular to the plug axis, the plug being equipped with sealing elements and being in on position, Figure 2 is a section like that of Figure 1 with the plug approaching off position, Figure 3 is a section on line 3—3 of Figure 2, Figure 4 is a section, like that of Figure 1, showing an arrangement in which the sealing elements are in the seat, Figure 5 shows the plug of Figure 4 approaching off position, and Figure 6 is an elevation of the plug of Figures 4 and 5.

The valve of Figures 1 to 3 comprises a housing 5 defining a seat 6 of circular cross section, the seat being either cylindrical or tapered. The housing includes, as here shown, diametrically opposed necks 7 and 8 defining inlet and outlet ports 9 and 10 intersecting the seat. Port 10 includes an outer portion 10' of the same diameter as the inlet port and an inner portion 10'' which directly intersects the seat and is of substantially greater diameter than and coaxial with portion 10'. The edge of portion 10'' is chamfered.

Reference numeral 11 designates a plug mating with the seat 6 and having a cylindrical diametrical flow passage 12 which, in the on position of Figure 1, directly connects ports 9 and 10. The passage includes ports 12' and 12''. On opposite sides of the passage the plug is provided with continuous grooves 13 and 14 which in the off position surround port 9 and port portion 10'', respectively, and in these grooves are disposed O-rings 15 and 16, respectively.

In Figure 2 the plug is being turned in the direction of the arrow 17 and is approaching off position, which position is reached when passage 12 is at right angles to the axis of necks 7 and 8. It will be seen that the leading side of ring 15 has passed the far side, in the direction of turn, of port 9 and is opposite the seat so as to seal therewith. The leading side of ring 16, on the other hand, is still spaced from the far edge, in the direction of turn, of port portion 10''. This means that pressure in the port 9 cannot pass ring 15 in any direction and so, in particular, cannot traverse passage 12 in the direction of arrow 18 to jet past the leading side of the ring 16. This is in contrast to prior constructions wherein with the leading side of ring 16 positioned as shown in Figure 2, the leading side of the ring 15 would not have reached the far edge of the inlet port, permitting pressure to pass around the valve in a path including the plug passage and so jet past the leading side of ring 16 with unseating effect.

It will be understood that with a plug provided with stop means so as to have to be reciprocated between on and off positions, it would only be necessary to enlarge port 10 at its far side. With the port enlarged on both sides as here shown, the valve can be turned in either direction from on to off without danger of clipping whichever side of the O-ring passing the outlet port happens to be the leading side.

In Figures 4 to 6 the housing 20 has an inlet port 21 and a coaxial outlet port 22 of the same size intersecting a seat 23. Grooves 24 and 25 are formed in the seat in surrounding relation to ports 21 and 22, respectively, and contain O-rings 26 and 27, respectively.

A rotary plug 28 mates with the seat and has a diametrical flow passage 29 with chamfered ports 30 and 31 of which the former has a larger diameter than the latter. In the on position of the plug, Figure 4, ring 26 seals with the plug around port 30 and ring 27 surrounds port 31.

When the plug is turned toward closed position in the direction of the arrow, Figure 5, the trailing side of port 31 engages the far side, in the direction of turn, of ring 27 to form a seal around port 22 while the trailing side of port 30 is still spaced from the far side of ring 26. Since flow through passage 29 is thus cut off, the far side of ring 26, which side would ordinarily be affected by the disturbing flow, remains in the groove and consequently will not be damaged when the chamfered edge of port 30 passes it.

Any suitable check means may be provided to insure that port 30 will always be the inlet port. If the plug had only a 90° turning range it would be necessary to enlarge port 30 only at its far side.

The enlarged ports are shown as circular as a matter of manufacturing expediency. Obviously, the enlargement could be only at one or both sides.

Instead of O-rings as such, I may employ equivalent sealing means such, for example, as the harness type shown in the copending application of Lucien W. Mueller, Serial No. 591,915, filed May 4, 1945. Other variations in the form and relation of parts are contemplated under the claims which follow.

I claim:

1. A valve comprising a housing having a seat of circular cross section and inlet and outlet ports intersecting said seat, a plug in said seat having a flow passage, said plug being turnable between on and off positions, grooves in said plug respectively surrounding said ports when the plug is in off position, and continuous rubber sealing elements in said grooves and deformable by fluid pressure in the off position into sealing engagement with the plug and seat, said elements lying between said ports in the on position, said ports and sealing elements being so related that when the plug is turned from on to off position the leading side of one of said elements will seal with the seat at the far side of the inlet port before the leading side of the other element reaches the far edge of the outlet port.

2. A valve comprising a housing having a seat of circular cross section and inlet and outlet ports intersecting said seat, a plug in said seat having a flow passage, said plug being turnable between on and off positions, grooves in said plug respectively surrounding said ports when the plug is in off position, and continuous rubber sealing elements in said grooves and deformable by fluid pressure in the off position into sealing engagement with the plug and seat, said elements lying between said ports in the on position, said outlet port being laterally enlarged so that when the plug is turned from on to off position the leading side of one of said elements will seal with the seat at the far side of the inlet port before the leading side of the other element reaches the far edge of the outlet port.

3. A valve comprising a housing having a seat of circular cross section and inlet and outlet ports intersecting said seat, a plug in said seat having a flow passage, said plug being turnable between on and off positions, grooves in said plug respectively surrounding said ports when the plug is in off position, and continuous rubber sealing elements in said grooves and deformable by fluid pressure in the off position into sealing engagement with the plug and seat, said elements lying between said ports in the on position, said outlet port being of sufficiently greater lateral dimension than the inlet port so that when the plug is turned in either direction from on to off position the leading side of one of said elements will seal with the seat at the far side of the inlet port before the leading side of the other element reaches the far edge of the outlet port.

4. A valve comprising a housing member having inlet and outlet ports and a seat of circular cross section intersected by said ports, a rotary plug member in said seat having a passage including inlet and outlet ports registrable with the housing member ports, said plug being turnable between on and off positions, said seat and plug member having opposed surfaces, the surface of one of said members being provided with annular grooves which in the off position of the plug member surround the ports of said housing member, continuous rubber sealing elements in said grooves deformable by fluid pressure into sealing engagement with the plug member and seat, one of the ports of the other of said members being laterally enlarged so that when the plug member is turned from on to off position a seal will be established by one of said sealing elements around one of the housing member ports to cut off flow through said passage before a seal is established by the other sealing element around the other housing member port, in order to prevent inlet pressure from escaping around the plug member and forcing the sealing element subjected to the influence of such pressure, to be pinched or mutilated as the plug member is being turned to its off position.

5. A valve comprising a housing having a seat of circular cross section and inlet and outlet ports intersecting said seat, a plug in said seat having a flow passage including inlet and outlet ports registrable with the housing ports, said plug being turnable between on and off positions, said seat having grooves surrounding the housing ports and surrounding the plug ports when the plug is in on position, continuous rubber sealing elements in said grooves deformable by fluid pressure in the off position into sealing engagement with the plug and seat, the plug inlet port being laterally enlarged so that the trailing edge of the plug outlet port completes a seal with the sealing element which surrounds the housing outlet port before the trailing edge of said enlarged port reaches the far side of the other sealing element.

6. A valve according to claim 5 wherein the plug inlet port is enlarged at both sides.

LORIN E. GROSBOLL.

REFERENCES CITED

The following references are of record in the file of this patent:

UNITED STATES PATENTS

| Number | Name | Date |
| --- | --- | --- |
| 862,143 | Duffy | Aug. 6, 1907 |
| 2,383,983 | Melichor | Sept. 4, 1945 |
| 2,392,319 | Harwood | Jan. 8, 1946 |

FOREIGN PATENTS

| Number | Country | Date |
| --- | --- | --- |
| 18,994 | Great Britain | of 1891 |
| 456,610 | Great Britain | Nov. 12, 1936 |